(12) United States Patent
Wang et al.

(10) Patent No.: US 12,358,145 B2
(45) Date of Patent: Jul. 15, 2025

(54) SYSTEM AND METHOD FOR THREE-DIMENSIONAL CALIBRATION OF A VISION SYSTEM

(71) Applicant: Cognex Corporation, Natick, MA (US)

(72) Inventors: Xiaoguang Wang, Johns Creek, GA (US); Yukun Bian, Suzhou (CN); Li Sun, Sudbury, MA (US); David Y. Li, West Roxbury, MA (US)

(73) Assignee: Cognex Corporation, Natick, MA (US)

( * ) Notice: Subject to any disclaimer, the term of this patent is extended or adjusted under 35 U.S.C. 154(b) by 100 days.

(21) Appl. No.: 17/198,333

(22) Filed: Mar. 11, 2021

(65) Prior Publication Data

US 2021/0291376 A1 Sep. 23, 2021

Related U.S. Application Data

(60) Provisional application No. 62/991,430, filed on Mar. 18, 2020.

(51) Int. Cl.
*B25J 9/00* (2006.01)
*B25J 9/16* (2006.01)

(52) U.S. Cl.
CPC ........... *B25J 9/1692* (2013.01); *B25J 9/1697* (2013.01)

(58) Field of Classification Search
CPC ..... B25J 9/1692; B25J 9/1697; G01B 21/042; G01B 11/245; G01B 11/2504;

(Continued)

(56) References Cited

U.S. PATENT DOCUMENTS 7,271,377 B2 9/2007 Mueller
8,379,014 B2 2/2013 Wiedemann
(Continued)

FOREIGN PATENT DOCUMENTS

CN 1968598 5/2007
JP 08110807 4/1996
(Continued)

*Primary Examiner* — Khoi H Tran
*Assistant Examiner* — Tien Minh Le
(74) *Attorney, Agent, or Firm* — Loginov & Associates, PLLC; William A. Loginov

(57) ABSTRACT

This invention provides a system and method for calibration of a 3D vision system using a multi-layer 3D calibration target that removes the requirement of accurate pre-calibration of the target. The system and method acquires images of the multi-layer 3D calibration target at different spatial locations and at different times, and computes the orientation difference of the 3D calibration target between the two acquisitions. The technique can be used to perform vision-based single-plane orientation repeatability inspection and monitoring. By applying this technique to an assembly working plane, vision-based assembly working plane orientation repeatability, inspection and monitoring can occur. Combined with a moving robot end effector, this technique provides vision-based robot end-effector orientation repeatability inspection and monitoring. Vision-guided adjustment of two planes to achieve parallelism can be achieved. The system and method operates to perform precise vision-guided robot setup to achieve parallelism of the robot's end-effector and the assembly working plane.

20 Claims, 5 Drawing Sheets

(58) Field of Classification Search
CPC ............ G01B 11/2545; G01B 2210/52; G05B 2219/39038; G05B 2219/39057; G06T 2207/30208; G06T 7/85; G06T 7/70; G06T 7/0002
See application file for complete search history.

(56) References Cited

U.S. PATENT DOCUMENTS

| | | | |
|---|---|---|---|
| 8,939,842 B2 | 1/2015 | Ehrmann | |
| 9,258,550 B1 | 2/2016 | Sieracki | |
| 9,661,308 B1 | 5/2017 | Wang | |
| 9,965,870 B2 | 5/2018 | Claveau | |
| 10,043,282 B2 | 8/2018 | Smits | |
| 11,176,674 B2 | 11/2021 | Diankov | |
| 11,176,706 B2 | 11/2021 | Javan Roshtkhari | |
| 2011/0280472 A1* | 11/2011 | Wallack | G06T 7/80 901/14 |
| 2015/0025683 A1* | 1/2015 | Amano | B25J 9/1692 700/254 |
| 2015/0142171 A1 | 5/2015 | Li | |
| 2017/0032537 A1* | 2/2017 | Li | H04N 17/002 |
| 2019/0122388 A1 | 4/2019 | Li | |
| 2019/0222824 A1 | 7/2019 | Sheridan | |
| 2020/0030971 A1 | 1/2020 | Oleynik | |
| 2020/0371237 A1 | 11/2020 | Schindler | |
| 2021/0012534 A1* | 1/2021 | Islam | G06T 7/75 |
| 2021/0089040 A1 | 3/2021 | Ebrahimi Afrouzi | |
| 2021/0162601 A1* | 6/2021 | Atherton | G01B 5/008 |
| 2022/0083058 A1 | 3/2022 | Passot | |

FOREIGN PATENT DOCUMENTS

| | | | |
|---|---|---|---|
| JP | 2001515236 A | 9/2001 | |
| JP | 2010261955 A | 11/2010 | |
| JP | 2013526423 A | 6/2013 | |
| JP | 2016052695 A | 4/2016 | |
| JP | 2016120567 | 7/2016 | |
| JP | 2018012184 A | 1/2018 | |
| JP | 2019195885 A | 11/2019 | |
| KR | 20170130320 | 11/2017 | |
| KR | 20190126458 | 11/2019 | |
| WO | 2014055909 | 4/2014 | |
| WO | 2018195096 A | 10/2018 | |
| WO | WO-2018195096 A1 * | 10/2018 | G06T 7/74 |

* cited by examiner

SYSTEM AND METHOD FOR THREE-DIMENSIONAL CALIBRATION OF A VISION SYSTEM

This application claims the benefit of U.S. Patent Application Ser. No. 62/991,430, entitled SYSTEM AND METHOD FOR THREE-DIMENSIONAL CALIBRATION OF A VISION SYSTEM, filed Mar. 18, 2020, the teachings of which application are incorporated herein by reference.

FIELD OF THE INVENTION

This invention relates to calibration systems and methods, and calibration objects (targets) used in machine vision system applications.

BACKGROUND OF THE INVENTION

In machine vision systems (also termed herein "vision systems"), one or more cameras are used to perform vision system process on an object or surface within an imaged scene. These processes can include inspection, decoding of symbology, alignment and a variety of other automated tasks. More particularly, a vision system can be used to inspect a workpiece residing in an imaged scene or guide a robot end effector moving between locations. The scene is typically imaged by one or more vision system cameras that can include internal or external vision system processors that operate associated vision system processes to generate results. In order to enable a vision system to perform the vision tasks(s) with sufficient accuracy and reliability, it is generally desirable to calibrate the system by establishing a spatial relationship between one or more cameras and the object or surface within the imaged scene. A calibration object or target can be employed in this process to represent the spatial properties (e.g. position and orientation) of the object or surface to be calibrated. By way of example, the image(s) of the workpiece can be characterized by two-dimensional (2D) image pixel data (e.g. x and y coordinates), three-dimensional (3D) image data (x, y and z coordinates) or a hybrid 2.5D image data, in which a plurality of x-y coordinate planes are essentially parallel and characterized by a variable z-height.

The calibration object or target (often in the form of a "plate") is often provided as a flat structure with distinctive patterns (artwork) made visible on its surface. The distinctive pattern is generally designed with care and precision, so that the user can easily identify each visible feature in an image of the target acquired by a camera. Some exemplary patterns include, but are not limited to, a tessellating checkerboard of squares, a checkerboard with additional inlaid codes at periodic intervals within the overall pattern, which specify feature positions, dot grids, line grids, a honeycomb pattern, tessellated triangles, other polygons, etc. Characteristics of each visible feature are known from the target's design, such as the position and/or rotation relative to a reference position and/or coordinate system implicitly defined within the design.

The design of a typical checkerboard pattern, which is characterized by a tessellated array of crossing lines, provides certain advantages in terms of accuracy and robustness in performing calibration. More particularly, in the two-dimensional (2D) calibration of a stationary object, determining the relative position of individual checkerboard tile corners by edges of the calibration checkerboards is typically sufficient to determine accuracy of the vision system, and as appropriate, provide correction factors to the camera's processor so that runtime objects are measured in view of such correction factors.

By way of further background, calibration of a vision system camera involves mapping the pixels of the camera sensor to a predetermined coordinate system. The target can provide features that define the coordinate system (e.g. the X-Y-axis arrangement of a series of checkerboards), such as 2D codes (also termed "barcodes") inlaid in the feature pattern, or distinctive fiducials that otherwise define the pattern coordinate system. By mapping the features to camera pixels, the system is calibrated to the target. Where multiple cameras are used to acquire images of all or portions of a calibration target, all cameras are mapped to a common coordinate system that can be specified by the target's features (e.g. x and y along the plane of the target, z (height) and rotation 6 about the z axis in the x-y plane), or another (e.g. global) coordinate system. In general, a calibration target can be used in a number of different types of calibration operations. By way of example, a typical intrinsic and extrinsic camera calibration operation entails acquiring images of the target by one or more camera(s) and calibrating relative to the coordinate system of the calibration target itself, using one acquired image of the target, which is in a particular position within at least part of the overall field of view of all cameras. The calibration application within the vision processor deduces the relative position of the one or more camera(s) from the image of the target acquired by that camera. Fiducials on the target can be used to orient the camera(s) with respect to the target within its respective field of view. This calibration is said to "calibrate camera(s) to the plate".

In general, prior setup procedures for applying 3D (e.g. stereo vision) vision system imaging to a scene entails the use of an accurate, and often time-consuming, pre-calibration process in which the features of the 3D calibration target must be accurately measured in all three dimensions. This process can be costly, requiring specialists to complete it. Moreover, to ensure accuracy and proper function of the vision system, the pre-calibrated parameters should remain unchanged for the entire life of the underlying 3D calibration device, which means the device must be properly maintained and free of perturbations over its entire operational life to ensure the stability of the pre-calibration. This level of care and maintenance can also be costly in a factory environment. Accurate vision system setup and health monitoring are key to high-quality production on a factory floor. As many setup/monitoring methods require a 3D calibration device, the above represent some of the major inconveniences associated with such 3D calibration devices. Note also that an accurate 3D calibration device requires micron-level accuracy of manufacture, which is very expensive.

Moreover, on the factory floor, there currently exists no practical technique to measure a working plane's orientation repeatability. Likewise, parallelism of a robotic end-effector plane and assembly plane typically requires a manual setup with a subjective, often time-consuming, and potentially inaccurate evaluation (e.g. based on pressure paper).

SUMMARY OF THE INVENTION

This invention overcomes disadvantages of the prior art by providing a system and method for calibration of a 3D vision system using a multi-layer (at least 2 layer) 3D calibration target that removes the requirement of accurate pre-calibration of the 3D target for initial setup of the workspace (e.g. manufacturing) arrangement system and subsequent health monitoring of this arrangements, as well as cumbersome maintenance requirements. The system and method acquires images of the multi-layer 3D calibration target at different spatial locations and at different times, and computes the orientation difference of the 3D calibration target between the two acquisitions. The technique can be used to perform vision-based single-plane orientation repeatability inspection and monitoring. By applying this technique to an assembly working plane, the system and method can perform vision-based assembly working plane orientation repeatability inspection and monitoring. In combination with a moving robot end effector, this technique can be used to provide vision-based robot end-effector orientation (also termed, "vision guided robotics (VGR)") repeatability inspection and monitoring. Likewise, vision-guided adjustment of two planes to achieve parallelism can be achieved. The system and method can operate to perform precise VGR setup to achieve parallelism of the robot's end-effector and the assembly working plane (i.e. robot tuning).

In various embodiments, a system and method for calibrating a vision system with respect to a 3D working space is provided. The system and method employs a multi-layer 3D calibration target having a plurality of surfaces at a respective plurality of mutually differing displacements and the plurality of surfaces having, respectively, discrete calibration patterns thereon. One of the surfaces can be in the form of a "main surface" upon which are placed other, smaller area, discrete surfaces. Image data containing the 3D calibration target is received and vision system tools are applied to the image data. The image data is analyzed using the vision tools to compute a difference between the displacement at a first spatial location and the displacement at a second spatial location to provide results. Illustratively the system and method can locate the 3D calibration target on a robotic end effector that provides motion feedback to the vision system, and can be arranged as a VGR system. By way of example, the 3D calibration target can comprise a main surface that is approximately rectangular, having four corners and four rectangular plates located adjacent to respective of the four corners. Also by way of example, the sides of the rectangular plates are positioned at a non-orthogonal angle with respect to sides of the main surface. The discrete calibration pattern, respectively, on each of the plurality of surfaces can comprise a checkerboard pattern having one or more ID codes embedded thereinto, which each contain information related to location within the calibration pattern. The image data can be analyzed using the vision tools to compute a difference between the displacement at the first spatial location and the displacement at another, second spatial location to provide results. The system and method can verify parallelism between a first plane and a second plane based upon the results and/or repeatability of a spatial orientation of the object plane in the working space over a desired time interval based upon the results. Illustratively, an optics assembly that is part of, or attached to, the camera assembly that generates the image data is provided. The optics assembly can be telecentric or non-telecentric. When the provided optics assembly is non-telecentric, the system and method moves the 3D calibration target and applies a closed loop 2D alignment process before and after the moving of the 3D calibration target.

BRIEF DESCRIPTION OF THE DRAWINGS

The invention description below refers to the accompanying drawings, of which.

DETAILED DESCRIPTION

I. System Overview

Figure 1:
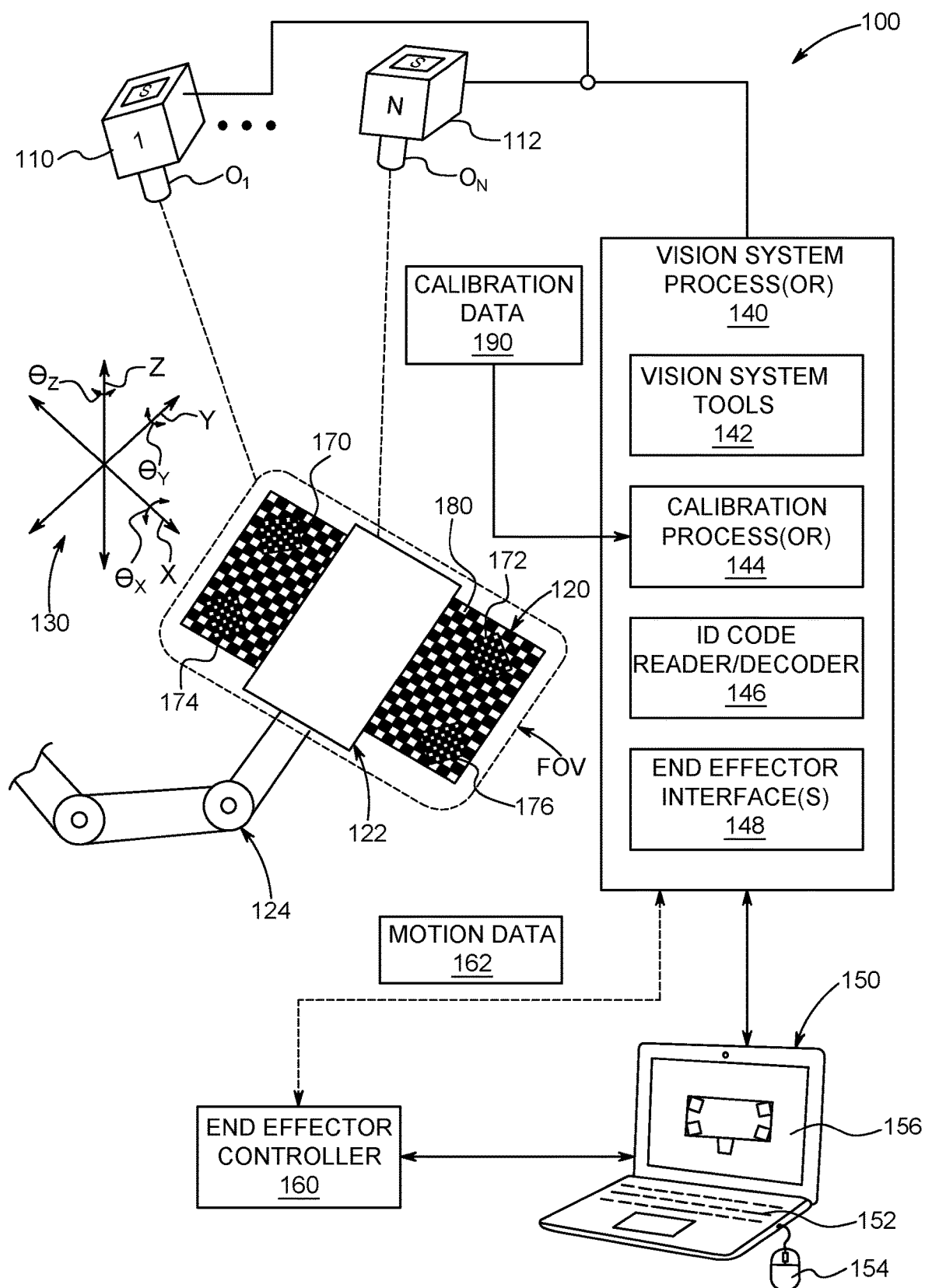
FIG. 1 is a diagram of an overall vision system arrangement undergoing a calibration process using a calibration target and associated stored calibration target feature relationship data in accordance with an exemplary embodiment.

FIG. 1 shows a vision system arrangement 100 consisting of one or more (a plurality) of cameras 1-N (110, 112) which acquire an image of at least one side of a calibration target 120 according to an exemplary embodiment. The camera(s) 110 and 112 are arranged to acquire an image of some or all of the calibration target 120 in the overall scene. The target 120 is shown within the field of view (FOV) of the camera(s) 110 and 112. The target 120 is supported by a moving robot end effector 122 that is located at the end of a motion device, such as a multi-axis robot arm 124. The orientation and gripping configuration of the end effector can be highly varied. In this example, the end effector 122 is shown partially overlying the target 120 using suctions cups or other removable securing mechanisms (not shown) that engage the surface of the target. The robot arm 124 is controlled by an appropriate controller 128 (described below). Its motion is defined by an appropriate coordinate space 130, defining orthogonal x, y and z axes and associated rotations θx, θy and θz. The number of camera(s) 110 and 112, and their orientation relative to the coordinate space (130) of the imaged scene is/are highly variable in alternate arrangements. In various embodiments, the robot end effector 122 and the motion device 124 can be substituted with one or more other types of working planes and motion devices, including, but not limited to, an assembly plane supported by other mechanisms, such as a conveyor and/or raising and/or clamping tools. In various embodiments, attachment of the 3D calibration target 120 to the working plane can occur at either the top (as shown) or the bottom of its main surface 180 (described below). Note that the term "main surface" should be taken broadly to include, by way of example, any appropriate surface arrangement that supports one or more, discrete, differing height smaller-area surfaces, which are projected above (or below) this main surface. In further alternate embodiments, the discrete single-optic camera(s) 110 and 112 depicted can be substituted with one or more other types of camera(s), including, but not limited to, laser displacement sensors, stereoscopic camera(s), LIDAR-based (more generally, range-finding) camera(s), time-of flight camera(s), etc.

The camera(s) 110 and 112 each include an image sensor S that transmits image data to one or more internal or external vision system processor(s) 140, that carry out appropriate 2D, 2.5D and/or 3D vision system processes using functional modules, processes and/or processors. By way of non-limiting example, the modules/processes can include a set of exemplary vision system tools 142 that find and analyze features in the image-such as edge finders and contrast tools, blob analyzers, calipers, range finders, etc. The vision system tools 142 interoperate with a calibration module/process 144 that performs calibration and establishes 3D relationships between the 3D target and the one or more cameras, represented in a common coordinate space (e.g. the depicted coordinate space 130). Note that the depicted coordinate space 130 of the scene can be defined in terms of Cartesian coordinates along associated, orthogonal x, y and z axes (and rotations, described above). Other types of coordinate systems—such as polar coordinates—can be employed to characterize the 3D image space in alternate embodiments. The vision system process(or) 140 can also include an ID/code finding and decoding module 146, that locates and decodes barcodes and/or other IDs of various types and standards using conventional or custom techniques. These ID codes, particularly include those embedded in the calibration target 120, as defined further below.

The processor 140 can be instantiated in a custom circuit or can be provided as hardware and software in a general purpose computing device 150 as shown. This computing device 150 can be a cloud computing arrangement, a server, PC, laptop, tablet, smartphone, and/or any other acceptable data processing implementation. The computing device can include a user interface—for example a keyboard 152, mouse 154, and/or display/touchscreen 156. The computing device 150 can reside on an appropriate communication network (e.g. a WAN, LAN) using a wired and/or wireless link. This network can connect to one or more data handling device(s), including a robot/end effector controller 160, and appropriate vision system interface(s) 148 therefor. The controller 160 can exchange information with the vision system data during calibration and runtime to provide motion feedback (using the robot's motion data from, e.g. steppers, encoders, etc.) 162 relative to end effector location to the vision system, and allow the vision system to visually guide the end effector in the 3D space.

II. 3D Calibration Target

Figure 2:
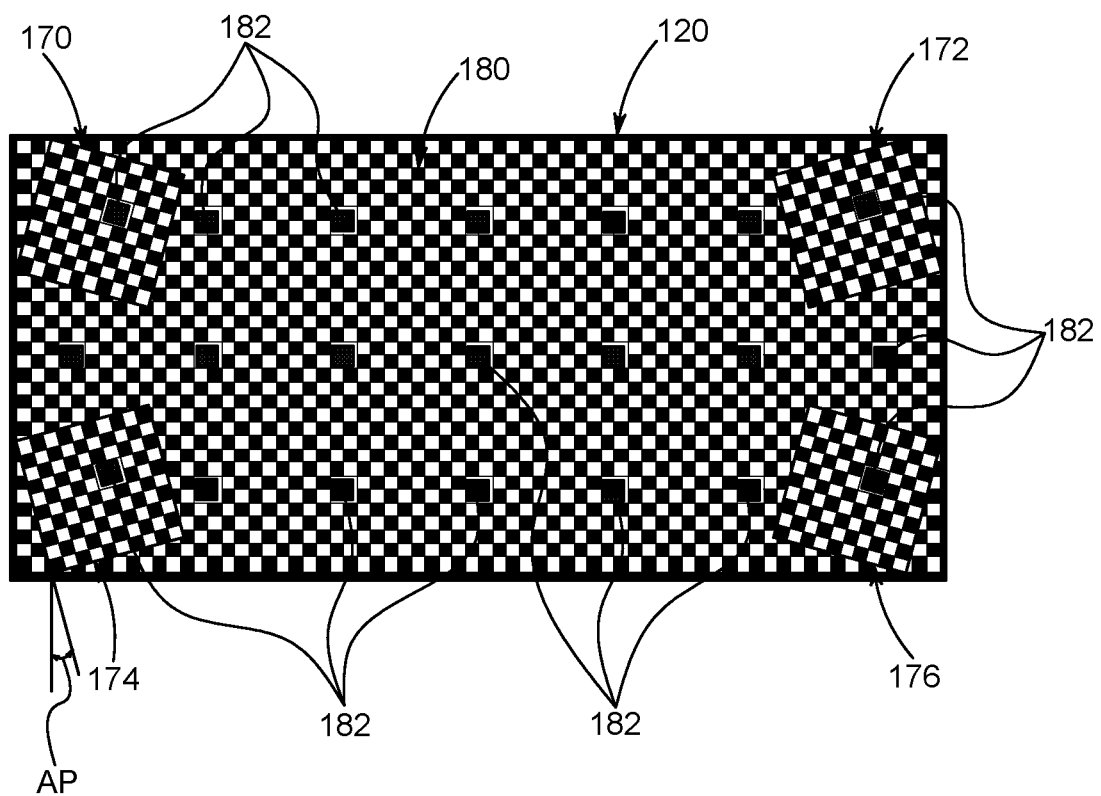
FIG. 2 is a top view of a two-level 3D calibration target for use with the system of FIG. 1.
Figure 3:
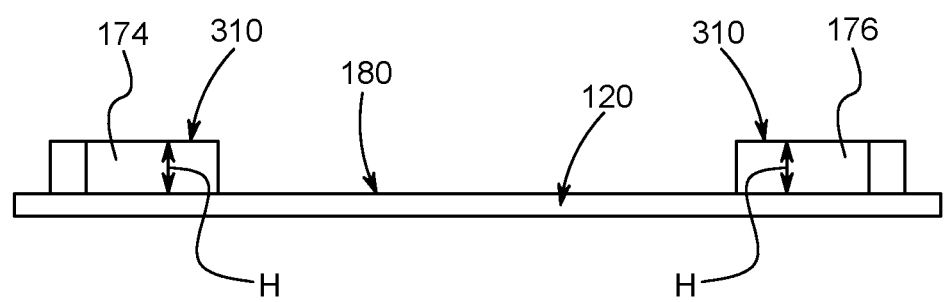
FIG. 3 is a side view of the two-level 3D calibration target of FIG. 1.

The calibration target 120 of the exemplary arrangement is one of a variety of implementations contemplated herein. With further reference to FIGS. 2 and 3, the target 120 can comprise a planar surface with associated artwork/calibration pattern (for example, a checkerboard of tessellating light and dark squares). In the depicted example, the calibration target 120 further includes a plurality of raised plates 170, 172, 174 and 176 on a main planar surface 180. These raised plates 170, 172, 174 and 176 also include a calibration pattern. Note that the calibration pattern on the tops of the plates 170-176 and the calibration pattern on the main surface 180 are unobscured by the end effector 122 in this example do that they can be imaged clearly by the camera(s). The plates 170-176 can define a perimeter that is square, rectangular, polygonal, or any other appropriate shape(s). Likewise, the plates can be oriented at any appropriate angle AP with respect to edges of the main surface 180—for example parallel or non-parallel thereto. The applied calibration pattern, in this example, is a precise black and white checkerboard of equally sized squares. Other predetermined patterns can be provided in alternate embodiments. The pattern on the main surface 180 and raised plates 170-176 is broken at given intervals in each of orthogonal directions by an ID code—for example a conventional 2D barcode 182, which contains information as to the relative location and arrangement of calibration pattern elements. This ID code arrangement allows the vison system processor 140, via the ID reader/decoder 146, to determine the location of adjacent calibration features within the FOV of the camera. Where the calibration target 120 occupies multiple (possibly overlapping) FOVs, the use of ID codes allows features in adjacent FOVs to be coordinated, thereby assisting multiple cameras in operating together.

The method of application of the calibration pattern to the target surface 180 is highly variable—for example screen-printing or photolithography can be employed. In general the lines defining the boundaries of features and their intersections is crisp enough to generate an acceptable level of resolution—which depending upon the size of the overall scene, can be measured in microns, millimeters, etc. As shown in FIG. 3, the raised plates 170-176 define a height H between the main plate surface 180 and the plate top surface 310 that can be similar for all plates 170-176, or can vary from plate-to-plate. Hence each plate, or groups of plates can define different discrete heights. Thus, in the exemplary embodiment each of the plate heights H are unequal so as to define different displacements at different locations relative on the main surface 180 (e.g. each of the four corners). In an exemplary embodiment the height H is highly variable, for example 1-50 millimeters. In general, this height information for each raised plate 170-176 is known in advance with relative precision and can be encoded in the printed barcode(s) 182. Some, or all, of the surfaces 310 can be parallel or non-parallel with respect to the main surface 180 in various embodiments. When imaged, the calibration features in each pattern (main plate surface 180 and smaller, raised plate surfaces 310) are disposed at a discrete (e.g. z-axis) height-spacing with respect to the camera(s).

The target 120 can be assembled together in a variety of manners. In a non-limiting example, the smaller-area plates 170-176 are adhered, using an appropriate adhesive (cyanoacrylate, epoxy, etc.) to the adjacent main plate surface 180 in the depicted angled orientations (relative to the main plate's x-y axes) adjacent to each of four adjacent corners on that surface 180. In this example parallelism between surfaces 180 and 310 need not be precisely controlled, nor is the x-y placement of the smaller plates on the larger plate. The calibration information from the procedures described herein (below) can be stored in a set of data 190, with respect to the processor 140.

A system and method for using a calibration target having two patterned sides, each with associated raised plates, is described in commonly assigned U.S. patent application Ser. No. 15/955,510, entitled HIGH-ACCURACY CALIBRATION SYSTEM AND METHOD, filed Apr. 17, 2018, the teachings of which are incorporated herein by reference as useful background information. This application describes techniques for calibrating a 3D vision system and employing ID codes embedded within the pattern to orient features in adjacent FOVs. This approach involves the use of pre-calibration, which is not required by the procedures described below, thereby simplifying the calibration process and avoiding a need to store data specific pre-calibration data relative to the 3D calibration target.

Figure 4:
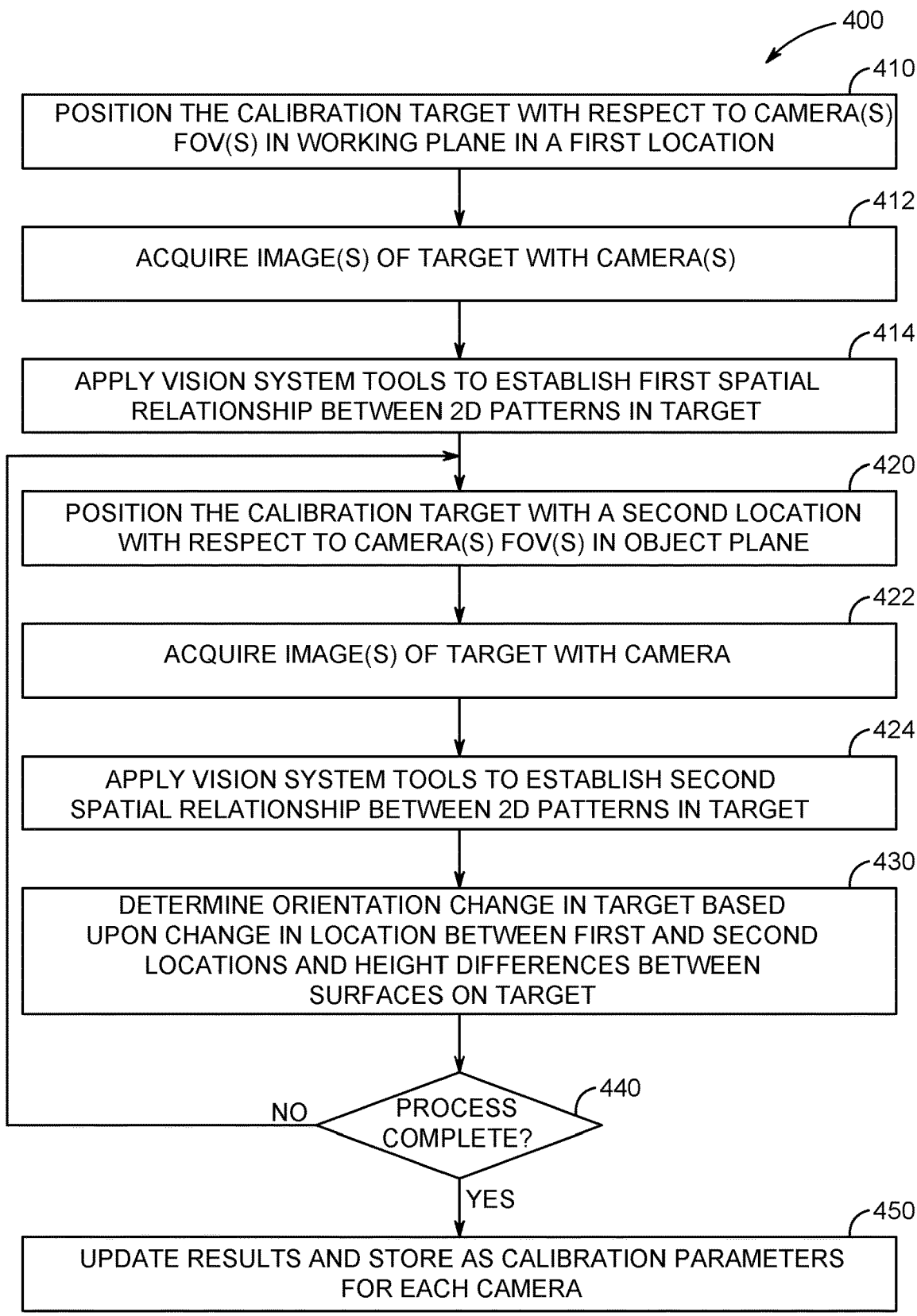
FIG. 4 is a flow diagram showing a procedure for verifying repeatability of an object plane, with either a fixed or moving calibration target FIG. 1, according to an exemplary embodiment.

III. Vision-Based Single-Plane Orientation Repeatability Inspection and Monitoring Reference is made to the procedure 400 of FIG. 4. This procedure 400 is operated in the presence of a setup that includes an object plane (e.g. an assembly working plane or a robot end-effector plane) and a camera imaging that plane. For an end-effector, the camera does not image the plane itself, but can image the 3D device (i.e. calibration target 120) once it is picked up by, or otherwise installed on (e.g. permanently, semi-permanently/detachably, etc.), the end-effector. Note that a standard 2D calibration procedure can be employed to the camera. In the procedure 400, the target 120 (FIGS. 1 and 2) is placed on the object plane in a manner that the pattern (also termed the effective layers) is within the camera's(s') FOV (step 410). Then, in step 412, one or more images of the target and its effective layers are acquired. In step 414, vision system tools (142 in FIG. 1) are applied to the image(s) to establish a first spatial relationship between 2D patterns on the discrete layers in the target. A second spatial relationship is then established in steps 420-424. In step 420, the 3D device is presented again to the camera(s) after a time interval, during which the object plane may have gone through motions (e.g. by robot arms or by supporting tools of an assembly plane), and have come back to its location within the camera's(s') FOV, and the 3D device may have been removed and then placed back on the object plane. One or more images(s) of the 3D device are acquired in step 422, and vision system tools (142 in FIG. 1) are applied in step 424 to the image(s) to establish the second spatial relationship between 2D calibration patterns on the discrete layers.

In step 430 of the procedure 400, the displacement (the difference between the first and the second relationships) is then used, together with the known height differences between the layers in each of the relationships, to calculate the orientation change of the plane between the first and the second locations/placements. This generates a result that can be stored as part of the calibration data (step 450 via decision step 440), and used to validate long-term calibration and repeatability of the arrangement. To further verify results and/or repeatability, the decision step 440 branches back to steps 420, 422 and 424 and recalculates results (step 430) using the stored first relationship with the new second relationship between another set of plates. This repeat of steps 420-430 can occur at intervals of minutes, days, weeks, etc. to verify the object plane's orientation repeatability.

It is contemplated that the above procedure 400 is employed with respective, attached, or integrated, camera optics assemblies (O1, ON in FIG. 1) that are a telecentric arrangement. If the optics assemblies O1, ON are non-telecentric, then special considerations exist for which additional steps are applied. In the case of a movable object plane (e.g. robot end-effector), after each placement of the target to establish a first or second spatial relationship, the end effector is then instructed to move within the plane back to the position of its first placement. This can be achieved by vision system tools that provide a standard 2D closed-loop alignment. Such alignment tool(s) are available, for example, from Cognex Corporation of Natick, MA. Alternatively, if the object plane is not movable (e.g. a clamped assembly plane), the target can be placed in a restricted region using mechanical retention techniques.

IV. Vision-Guided Adjustment of Two Planes to Achieve Parallelism

Figure 5:
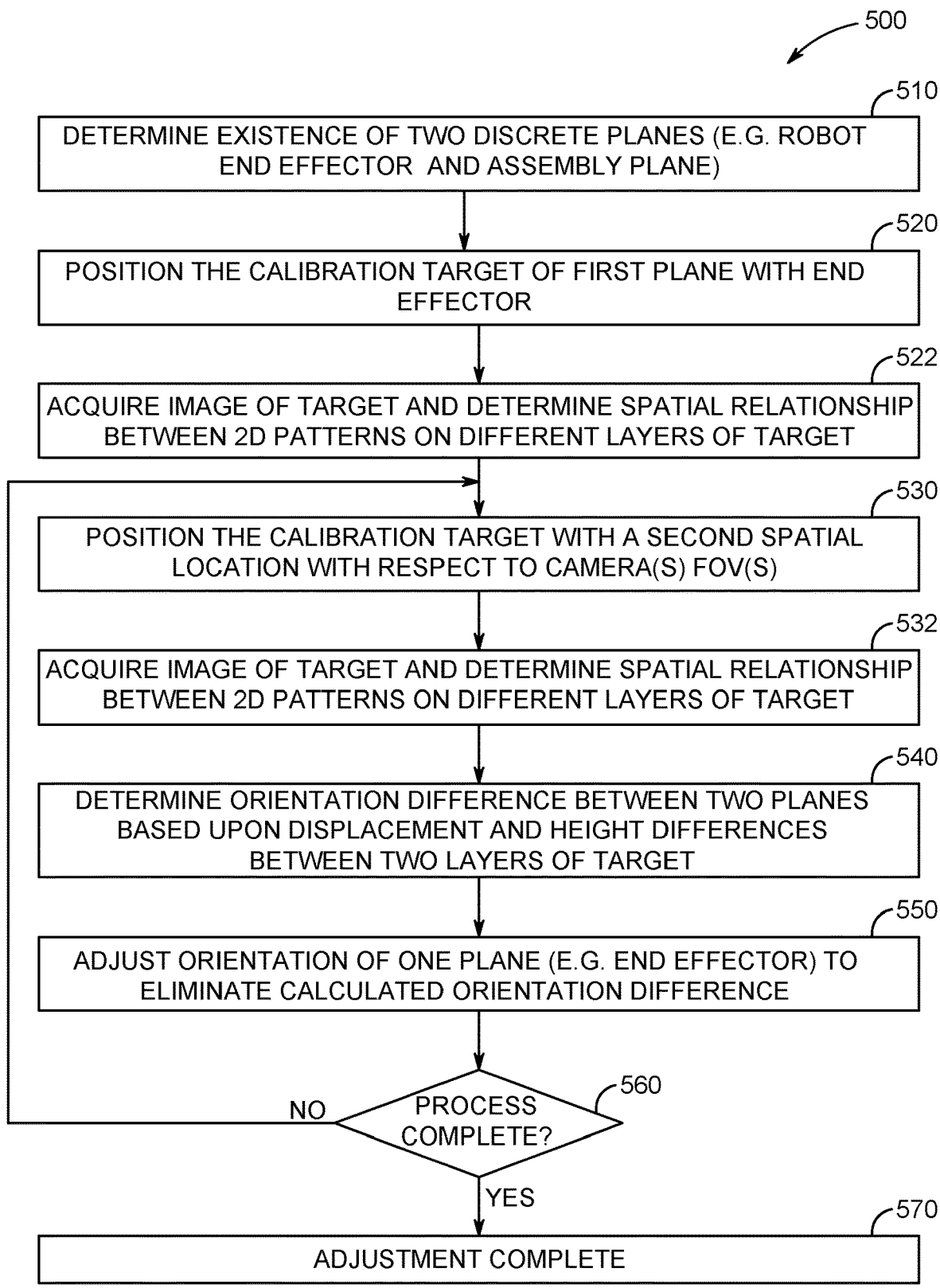
FIG. 5 is a flow diagram showing a procedure for determining parallelism, with either a fixed or moving calibration target FIG. 1, according to an exemplary embodiment.

With reference to the procedure 500 of FIG. 5, the arrangement employs a setup that defines two discrete planes (e.g. a robot end-effector and an assembly or working plane) in which the camera(s) image both planes (step 510). A goal of the procedure 500 is to achieve a parallel relationship between these two planes. In an exemplary implementation, the orientation of one plane (e.g. robot end-effector) is adjustable. A standard 2D calibration method can be used to initially calibrate the camera(s) with the motion system. According to the procedure 500, in step 510, the 3D target is located on the first plane. In step 522, one or more image(s) of the 3D target are then acquired by the camera(s) with a region of interest around two of the layers in a first spatial location. In step 530, and one or more image(s) of the target are acquired by the camera(s) at a second spatial location. The spatial relationship between 2D patterns on different layers of the target are obtained using appropriate vision tools. The known displacement (the difference between the two relationships based upon known height information) is then used, together with the height differences between the layers, to calculate the orientation difference of the two planes in step 540. In step 550, the orientation of one plane (e.g. robot end-effector) is then adjusted, based upon the difference from step 540, to eliminate this calculated orientation difference. In the case of a robot, appropriate motion commands can be transmitted to its controller to address the difference.

Steps 530-550 of the procedure 500 can be performed in a closed-loop style via decision step 560 until the process is complete, at which point the procedure ends (step 570). More particularly, after the first adjustment (step 550), the decision step 560 branches back to step 530 to acquire another image of the 3D calibration target and recalculates (step 540) the orientation difference using the new displacement from step 550. The adjustment (step 550) is again undertaken with this new difference. The process of steps 530-550 is repeated in a loop (via decision step 560) until the calculated orientation difference is sufficiently small. At such time, the process is deemed complete via decision step 560 and end step 570. Adjustment information can be stored as appropriate.

Again, the above procedure 500 assumes use of camera optics assemblies O1, ON that comprise a telecentric lens. If the lens used by the camera is non-telecentric, the procedure 500 also employs special considerations. According to these special procedure steps, the two planes should be at the same height (i.e. the same working distance with respect to the camera(s)). After the placement (and each adjustment) of the 3D calibration target on the second plane (step 550), the target is moved (e.g. by instructing the robot) within the plane to the position at which the 3D device was measured in the first plane (step 522). This result can be achieved using a standard 2D closed-loop alignment process.

In each of the above procedures the specific computation used to achieve results should be clear to those of skill. In general, such computations employ known principles of three-dimensional geometry as applied to a digital computing environment.

V. Conclusion

It should be clear that the above-described system and method effectively eliminates the need for a costly and time-consuming pre-calibration procedure, which can be out of the control of the end user. The system and method effectively address long-term maintenance concerns with respect to the underlying manufacturing arrangement by maintaining performance that is accurate and similar to the pre-calibrated state of that arrangement. More particularly, the system and method ensures long-term repeatability and parallelism of planes in the workspace. The system and method allows for gauging/measurement where features are not at the same height and camera mounting is not precise in a manner that is rapid, straightforward and economical.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for calibrating a vision system with respect to a 3D working space comprising:
    a vision system processor that receives image data captured by a single camera and applies vision system tools to the image data;
    a multi-layer 3D calibration target having a plurality of surfaces at a respective plurality of mutually differing displacements relative to the single camera and the plurality of surfaces having, respectively, discrete calibration patterns thereon, the image data comprising views of the plurality of surfaces of the multi-layer 3D calibration target disposed in a plurality of spatial locations of the 3D working space; and
    a determination process that analyzes the image data using the vision tools to
        compute, for each of a first spatial location and a second spatial location of the plurality of spatial locations of the 3D working space depicted in the image data, spatial relationships of at least two of the discrete calibration patterns disposed on different surfaces of the plurality of surfaces, wherein the first spatial location differs in three orthogonal dimensions from the second spatial location in the 3D working space, and
        determine a difference between the computed spatial relationship of the first spatial location and the computed spatial relationship of the second spatial location to provide results.

2. The system as set forth in claim 1 wherein the 3D calibration target is located on a robotic end effector.

3. The system as set forth in claim 2 wherein vision-guided robotics (VGR) control signals are transmitted between the vision system processor and a controller for the robotic end effector.

4. The system as set forth in claim 1 wherein the plurality surfaces of the calibration target comprise a main surface and a plurality of raised surfaces projecting therefrom.

5. The system as set forth in claim 4 wherein sides of the plurality of raised surfaces comprise a plurality of rectangular plates that are positioned at a non-orthogonal angle with respect to sides of the main surface.

6. The system as set forth in claim 1 wherein the plurality of surfaces respectively have a calibration pattern that defines a checkerboard pattern, the checkerboard pattern having one or more ID codes embedded thereinto that contain information related to location within the calibration pattern.

7. The system as set forth in claim 1 wherein the determination process analyzes the image data using the vision tools to compute a difference between the spatial relationship of the first spatial location and the spatial relationship calculated for another, second spatial location to provide the results.

8. The system as set forth in claim 7 wherein the results are used to determine parallelism between a first plane and a second plane.

9. The system as set forth in claim 7 wherein the results are used to determine repeatability of a spatial orientation of an object plane in the working space over a desired time interval.

10. The system as set forth in claim 1, further comprising, a camera assembly operatively connected to the vision system processor, having an optics assembly that is non-telecentric, wherein the 3D calibration target is moved and a closed loop 2D alignment process is applied before and after moving the 3D calibration target.

11. A method for calibrating a vision system with respect to a 3D working space comprising the steps of:
    providing a multi-layer 3D calibration target having a plurality of surfaces at a respective plurality of mutually differing displacements and the plurality of surfaces having, respectively, discrete calibration patterns thereon;
    receiving image data containing views of the plurality of surfaces of the 3D calibration target in a plurality of spatial locations of the 3D working space and applying vision system tools to the image data;
    computing, for each of a first spatial location and a second spatial location of the plurality of spatial locations of the 3D working space depicted in the image data, spatial relationships of at least two of the discrete calibration patterns disposed on different surfaces of the plurality of surfaces, wherein the first spatial location differs in three orthogonal dimensions from the second spatial location in the 3D working space; and
    analyzing the image data using the vision tools to compute a difference between the computed spatial relationship of the first spatial location and the computed spatial relationship of the second spatial location to provide results.

12. The method as set forth in claim 11, further comprising, locating the 3D calibration target on a robotic end effector.

13. The method as set forth in claim 12, further comprising, transmitting vision-guided robotics (VGR) control signals between the vision system processor and a controller for the robotic end effector.

14. The method as set forth in claim 11 wherein the plurality surfaces of the calibration target comprise a main surface and a plurality of raised surfaces projecting therefrom.

15. The method as set forth in claim 14 wherein sides of the plurality of raised surfaces define a plurality of rectangular plates that are positioned at a non-orthogonal angle with respect to sides of the main surface.

16. The method as set forth in claim 11 wherein the plurality of surfaces respectively have a calibration pattern that defines a checkerboard pattern, the checkerboard pattern having one or more ID codes embedded thereinto that contain information related to location within the calibration pattern.

17. The method as set forth in claim 11, further comprising, analyzing the image data using the vision tools to compute a difference between the spatial relationship of the first spatial location and the spatial relationship calculated for another, second spatial location to provide the results.

18. The method as set forth in claim 17, further comprising, verifying parallelism between a first plane and a second plane based upon the results.

19. The method as set forth in claim 17, further comprising, verifying repeatability of a spatial orientation of the object plane in the working space over a desired time interval based upon the results.

20. The method as set forth in claim 11, further comprising, providing an optics assembly for a camera assembly that generates the image data, that is non-telecentric, and moving the 3D calibration target and applying a closed loop 2D alignment process before and after the moving of the 3D calibration target.

* * * * *